(12) United States Patent
Webster

(10) Patent No.: US 8,064,469 B2
(45) Date of Patent: Nov. 22, 2011

(54) PARALLEL VLAN AND NON-VLAN DEVICE CONFIGURATION

(75) Inventor: Philip J. Webster, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 302 days.

(21) Appl. No.: 12/188,342

(22) Filed: Aug. 8, 2008

(65) Prior Publication Data

US 2010/0034117 A1 Feb. 11, 2010

(51) Int. Cl.
- *H04L 12/28* (2006.01)
- *H04L 12/56* (2006.01)
- *G05B 15/00* (2006.01)
- *G06F 7/00* (2006.01)

(52) U.S. Cl. ............ 370/401; 370/254; 370/351

(58) Field of Classification Search ............ 370/254, 370/351, 401; 700/1; 709/227
See application file for complete search history.

(56) References Cited

U.S. PATENT DOCUMENTS

| | | | |
|---|---|---|---|
| 6,157,965 A | 12/2000 | Mohammed et al. | |
| 6,418,480 B1 * | 7/2002 | Rijhsinghani | 709/245 |
| 7,242,665 B2 | 7/2007 | Langille et al. | |
| 2003/0167338 A1 * | 9/2003 | Hare et al. | 709/236 |
| 2003/0188031 A1 * | 10/2003 | Deikman et al. | 709/250 |
| 2005/0083952 A1 * | 4/2005 | Swain | 370/401 |
| 2007/0233825 A1 * | 10/2007 | Brownell et al. | 709/220 |
| 2008/0273459 A1 * | 11/2008 | Swain | 370/230 |
| 2009/0132060 A1 * | 5/2009 | Jenks | 700/7 |
| 2009/0268734 A1 * | 10/2009 | Wang et al. | 370/392 |

* cited by examiner

*Primary Examiner* — Marsha D Banks Harold
*Assistant Examiner* — Saad Hassan
(74) *Attorney, Agent, or Firm* — Haynes and Boone, LLP

(57) ABSTRACT

A cloning device driver system includes a subsystem to configure a virtual local area network (VLAN) switch port configuration for tagged operation and a subsystem to configure a non-virtual local area network (non-VLAN) switch port configuration for tagged operation. In operation, the cloning device driver system allows modification of the non-VLAN switch port configuration independent of the VLAN port configuration, thereby allowing an information signal to pass to a physical layer (PHY) of an open system interconnection (OSI) device.

20 Claims, 4 Drawing Sheets

PARALLEL VLAN AND NON-VLAN DEVICE CONFIGURATION

BACKGROUND

The present disclosure relates generally to information handling systems, and more particularly to parallel VLAN and non-VLAN device configurations.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A local area network (LAN) is generally known as a network to link multiple IHSs across a small geographic area, such as an office or a home. A virtual local area network (VLAN) is similar to a LAN, except that IHSs coupled together via a VLAN may be located across a larger geographic area and communicate as if the multiple IHSs are connected to a common LAN communication cable.

A problem is that a VLAN system generally operates on an actual LAN system. Therefore, when a LAN system is modified, the changes also need to be made to the VLAN system. This can cause additional problems because the VLAN devices may be located far apart from one another and a technician would have to travel to each VLAN location to complete the changes.

Accordingly, it would be desirable to provide an improved parallel VLAN and non-VLAN device configuration absent the disadvantages discussed above.

SUMMARY

According to one embodiment, a cloning device driver system includes a subsystem to configure a virtual local area network (VLAN) switch port configuration for tagged operation and a subsystem to configure a non-virtual local area network (non-VLAN) switch port configuration for tagged operation. In operation, the cloning device driver system allows modification of the non-VLAN switch port configuration independent of the VLAN port configuration, thereby allowing an information signal to pass to a physical layer (PHY) of an open system interconnection (OSI) device.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
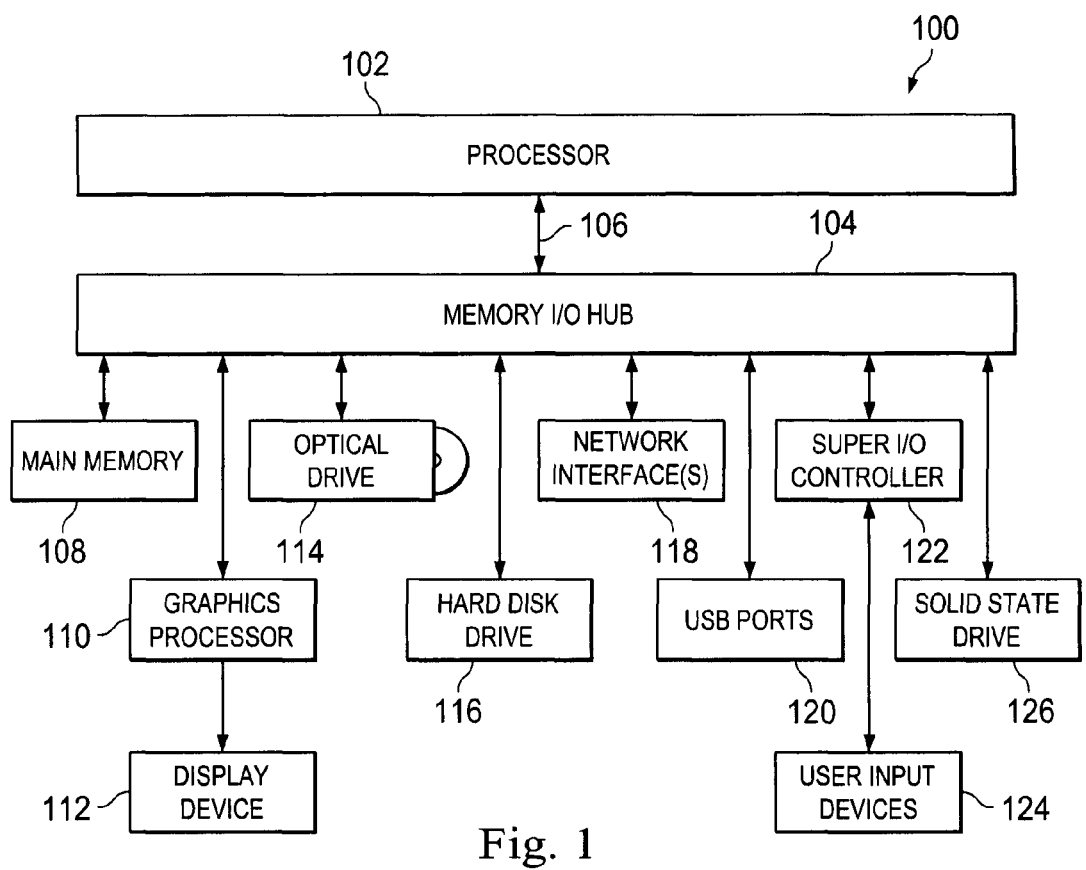
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

The present disclosure describes an embodiment of a clone device and algorithm that allows non-VLAN configuration modifications independent of VLAN configurations of a Linux network interface.

Figure 2:
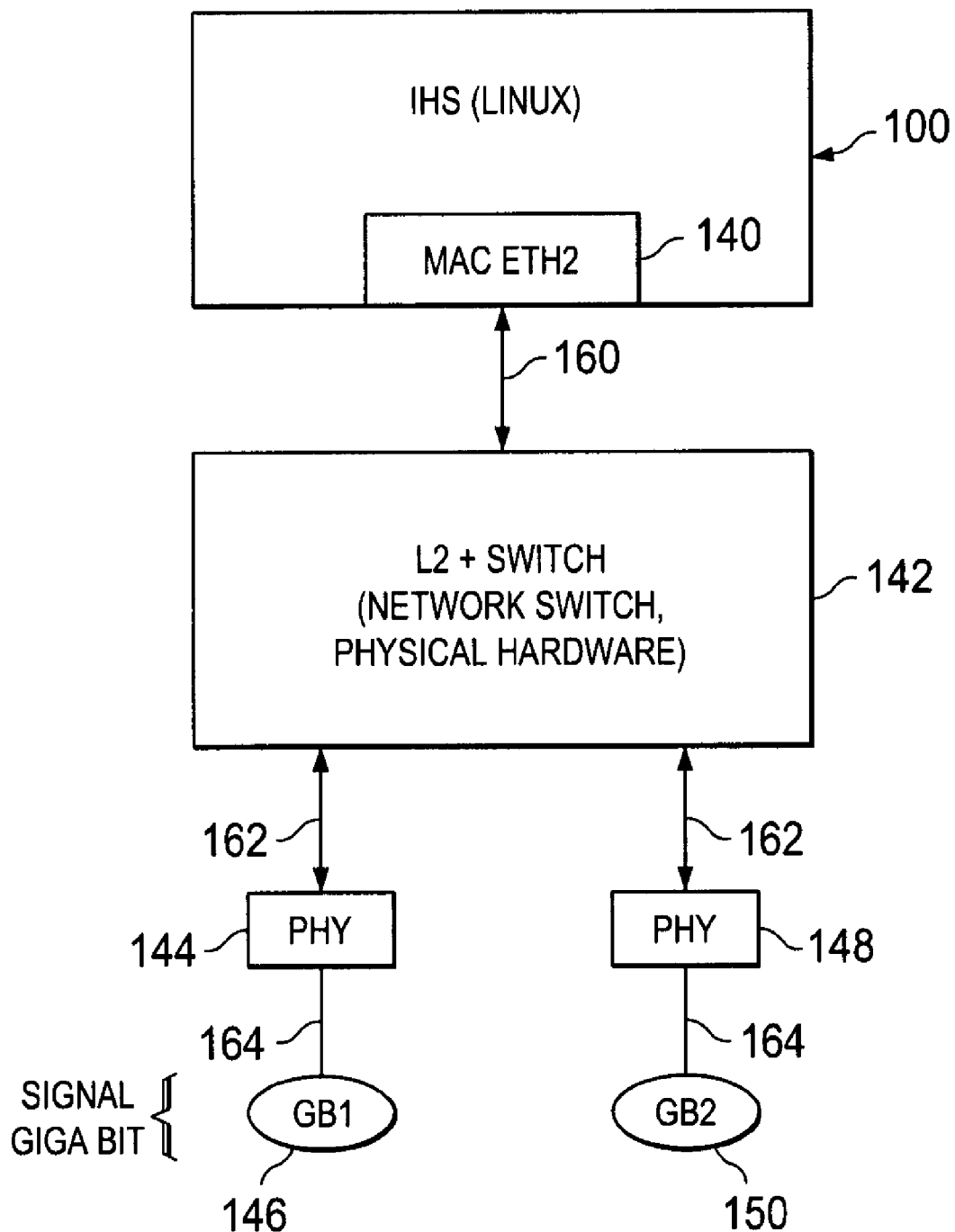
FIG. 2 illustrates a block diagram of an embodiment of a virtual local area network system (VLAN) configuration communication.
Figure 3:
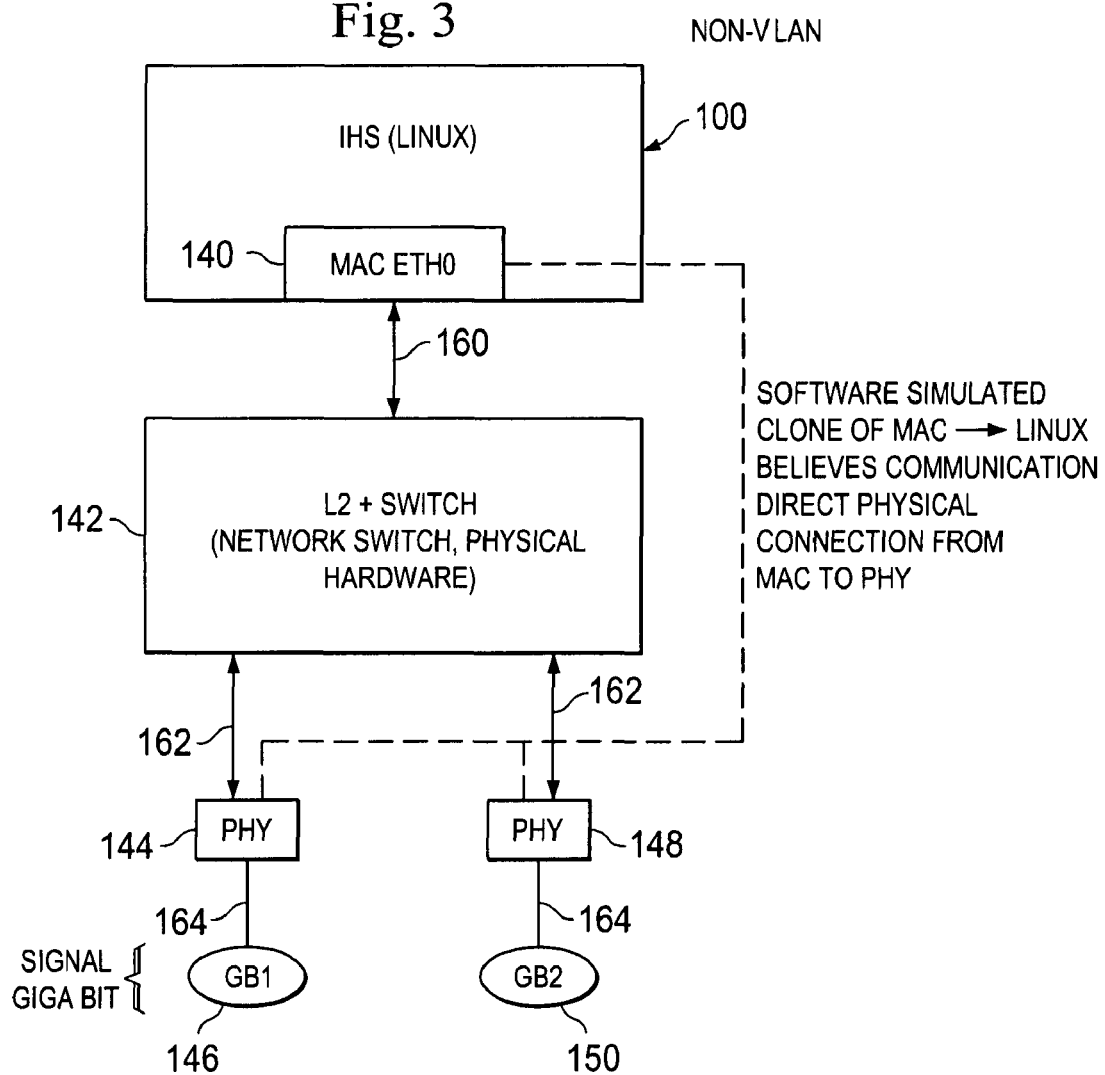
FIG. 3 illustrates a block diagram of an embodiment of a non-virtual local area network (non-VLAN) configuration communication.

FIGS. 2 and 3 respectively illustrate block diagram embodiments of a virtual local area network system (VLAN) and a non-virtual local area network (non-VLAN) configuration communication. IHS 100 configured as a server (e.g., a blade server), may use a network switch 142, such as an embedded level 2 network switch, to couple a chassis management controller (CMC) to the system's management controllers (e.g., remote access controllers) on each blade server 100, as well as input/output (I/O) modules (e.g., memory I/O hub 104) and local keyboard/video/mouse modules (e.g., user input devices 124). In an embodiment, this switch 142 is managed using a CMC Linux operating system. This present disclosure includes a cloning device driver that makes it possible to configure the switch ports for both VLAN (FIG. 2) and non-VLAN (FIG. 3) tagged operation, permitting modification of the non-VLAN switch configuration independent of the VLAN port configuration.

In different embodiments, the CMC L2 switch 142 has internal media access control (MAC) (e.g., an eth2 Ethernet interface device)/physical (PHY) 144, 148 pairs (e.g., ports 0-23), an internal MAC without a PHY for the connection to an internal processor 102 (e.g., port 24), and two internal MACs (e.g., ports 25-26) coupled with gigabit PHYs (e.g., GB1, GB2 146, 150) external to the switch 142. From the perspective of the Linux-based processor 102, the connection to the L2 switch 142 is a MAC-MAC link without a PHY 144, 148 (e.g., port 24), and the GB1/GB2 ports 146, 150 are PHYs 144, 148 without a MAC 140 (e.g., eth2 Ethernet interface), 141 (e.g., eth0 Ethernet interface).

Communication may be communicated between the MAC 140, 141 and the L2 switch 142 using communication coupling 160. Communication may be communicated between the L2 switch 142 and one or more PHYs 144, 148 using communication coupling 162. Communication may be communicated between the one or more PHYs 144, 148 and the GB1/GB2 ports 146, 150 using the communication coupling 164.

Internal to Linux, it is possible to create a network device which virtualizes a standard underlying network device. This technique may be used to add a VLAN driver logically on top of a typical Ethernet driver. Thus, a Linux mechanism may be used to create non-VLAN clone devices that operate in parallel to the VLAN device. In an embodiment, the CMC's Linux implementation, the MAC-MAC link from the IHS 100 to the switch 142 is first created as eth2. At this point, a VLAN device (e.g., a VLAN 4003 device) is created on top of the eth2 device.

Linux allows VLAN packets on the vlan 4003 device, non-VLAN packets on the eth2, to both ingress and egress the L2 switch 142. However, modifications of non-VLAN configuration may require eth2 to be modified (e.g., ifconfig'd down). This may disable the VLAN device as well.

For example, the following non-VLAN configuration operations will affect the VLAN operation on the device vlan 4003:

Ifcongfig eth2 down
Ifconfig eth2 hw ether 00:1C:23:CC:AD:84

In an embodiment, the CMC, clone devices above the eth2 may be created using the eth2 management data input/output (MDIO) bus for GB1 (eth0) and GB2 (eth1), in addition to the vlan 4003 device. An MDIO is a bus structure for using an Ethernet protocol. MDIO is generally defined for coupling MAC devices 140, 141 with PHY devices 144, 148 via the L2 switch 142 and providing an access method to internal registers of PHY devices 144, 148. The internal registers of PHY devices 144, 148 provide configuration information to the PHY 144, 148. This allows a user to change configuration information during operation and to read the PHY device's 144, 148 status. Thus, modifications to the non-VLAN configuration are performed on eth0, and do not require loss of operation on the VLAN. Therefore, the following example of a non-VLAN configuration operation has no effect on the VLAN operation of vlan 4003:

Ifconfig eth0 down
Ifconfig eth0 ether 00:1C:23:CC:AD:84

Figure 4:
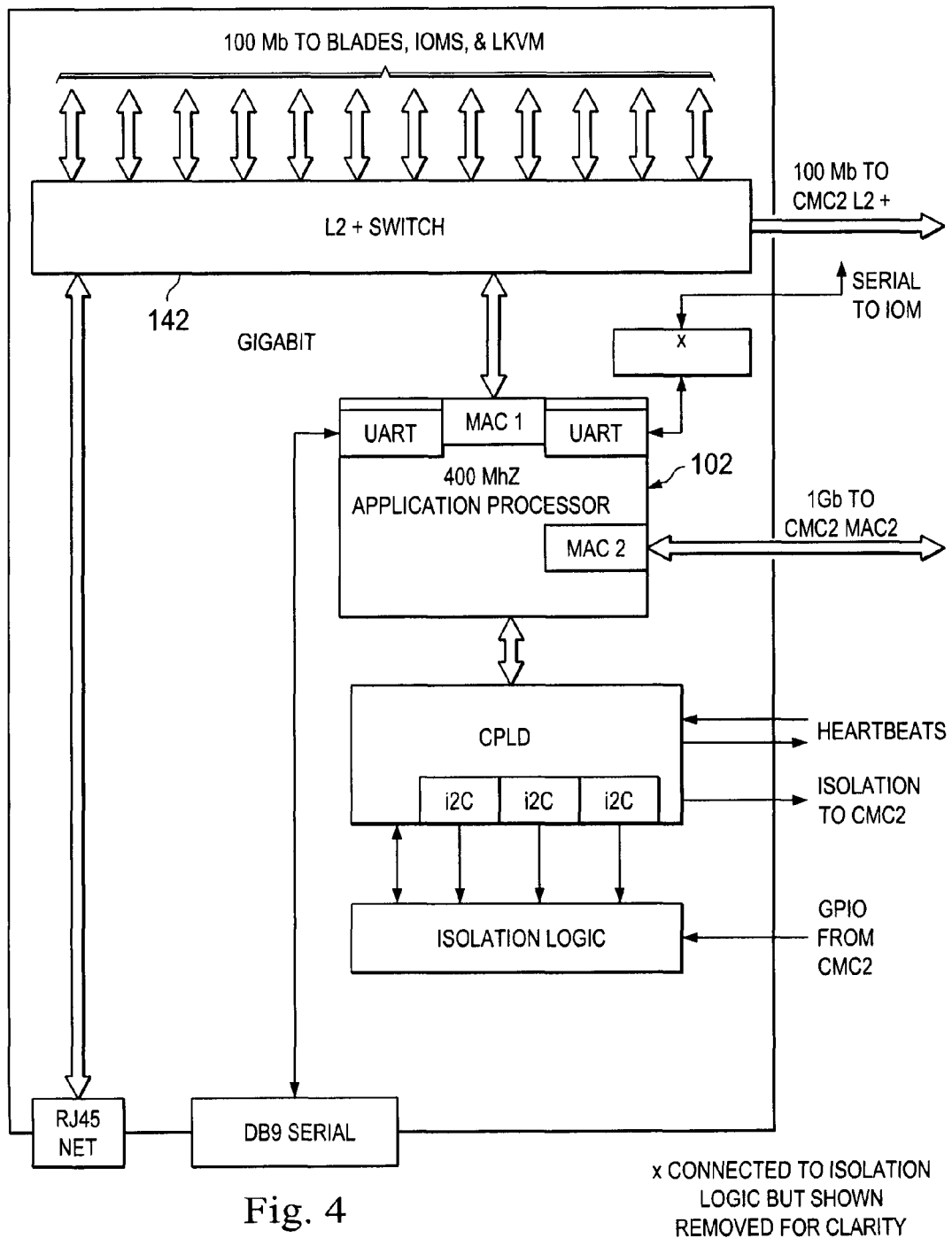
FIG. 4 illustrates a block diagram of an embodiment of a network switch.

As shown in FIG. 3, a software simulated clone of the MAC 141 causes the Linux system to believe or operate as if communication is direct physical connection from MAC 141 to the PHY 144, 148. In an embodiment, communication actually passes through the L2 switch 142, but Linux operates as if the communication is direct from MAC 141 to PHY 144, 148. This may be accomplished by "hiding" L2 switch 142 from Linux and reporting to the Linux system that communications are not going through L2 switch 142, but directly from MAC 141 to PHY 144, 148. FIG. 4 illustrates a block diagram of an embodiment of a network switch. As should be understood by a person having ordinary skill in the art, FIG. 4 illustrates the network switch 142, and the switch ports, discussed above. In an embodiment, the Linux operating system executes on the IHS 100 application processor 102.

In summary, what is described is a clone device algorithm that allows non-VLAN configuration modifications independent of the VLAN configuration of a Linux network interface. In other words, the present disclosure allows operation of VLAN and non-VLAN devices independent of one another and allows the use of standard Linux tools to configure a network.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtual local area network (VLAN) system, comprising:
   an information handling system (IHS) with an IHS media access control (MAC) Ethernet interface device, wherein the IHS MAC Ethernet interface device does not include a physical transceiver (PHY);
   a physical network switch including a physical network switch MAC Ethernet interface device, the physical network switch connecting the IHS MAC Ethernet interface to the physical network switch MAC Ethernet interface device, wherein a first VLAN is accessible over the connection of the IHS MAC Ethernet interface device and the physical network switch MAC Ethernet interface device; and
   a virtualized network device that comprises a virtualization of the connection of the IHS MAC Ethernet interface device and the physical network switch MAC Ethernet interface device, wherein a VLAN driver has been logically added to the virtualized network device;
       wherein the virtualized network device simulates a direct communication between the IHS MAC Ethernet interface device and a PHY connected to a port on the physical network switch; and
       wherein modifications to a non-VLAN configuration using the virtualized network device do not result in a loss of operation of the first VLAN.

2. The system of claim 1, wherein communication using the virtualized network device passes through the physical network switch.

3. The system of claim 1, wherein the connection of the IHS MAC Ethernet interface device and the physical network switch MAC Ethernet interface device includes an eth2 Ethernet interface.

4. The system of claim 1, wherein modifications to the non-VLAN configuration using the virtualized network device are performed over an eth0 Ethernet interface.

5. The system of claim 1, wherein the modifications to the non-VLAN configuration using the virtualized network device include an ifconfig operation.

6. The system of claim 1, wherein the first VLAN is logically added to a Ethernet driver for the connection of the IHS MAC Ethernet interface device and the physical network switch MAC Ethernet interface device.

7. The system of claim 6, wherein a non-VLAN device operates in parallel with the first VLAN.

8. An information handling system (IHS) including an operating system, comprising:
   a processor;
   memory coupled with the processor;
   an IHS media access control (MAC) Ethernet interface device, wherein the IHS MAC Ethernet interface device does not include a physical transceiver (PHY);
   a physical network switch including a physical network switch MAC Ethernet interface device, the physical network switch connecting the IHS MAC Ethernet interface device to the physical network switch MAC Ethernet interface device, wherein a first virtual local area network (VLAN) is accessible over the connection of the IHS MAC Ethernet interface device and the physical network switch MAC Ethernet interface device; and
   a virtualized network device that comprises a virtualization of the connection of the IHS MAC Ethernet interface device and the physical network switch MAC Ethernet interface device, wherein a VLAN has been logically added to the virtualized network device;
      wherein the virtualized network device simulates a direct communication between the IHS MAC Ethernet interface device and a PHY connected to a port on the physical network switch; and
      wherein modifications to a non-VLAN configuration using the virtualized network device do not result in a loss of operation of the first VLAN.

9. The IHS of claim 8, wherein the communication using the virtualized network device passes through the physical network switch.

10. The IHS of claim 8, wherein the connection of the IHS MAC Ethernet interface device and the physical network switch MAC Ethernet interface device includes an eth2 Ethernet interface.

11. The IHS of claim 8, wherein modifications to the non-VLAN configuration using the virtualized network device are performed over an eth0 Ethernet interface.

12. The IHS of claim 8, wherein the modifications to the non-VLAN configuration using the virtualized network device include an ifconfig operation.

13. The IHS of claim 8, wherein the first VLAN is logically added to a Ethernet driver for the connection of the IHS MAC Ethernet interface device and the physical network switch MAC Ethernet interface device.

14. The IHS of claim 13, wherein a non-VLAN device operates in parallel with the first VLAN.

15. A method of operating a virtual local area network (VLAN), comprising:
   providing an information handling system (IHS) with an IHS media access control (MAC) Ethernet interface device that does not include a physical transceiver (PHY), wherein the IHS MAC Ethernet interface device is coupled to a physical network switch MAC Ethernet interface device in a physical network switch,
   creating a first VLAN that is accessible over the connection of the IHS MAC Ethernet interface device and the physical network switch MAC Ethernet interface device;
   creating a virtualized network device that comprises a virtualization of the connection of the IHS MAC Ethernet interface device and the physical network switch MAC Ethernet interface device;
   logically adding a VLAN driver to the virtualized network device;
   simulating a direct communication between the IHS MAC Ethernet interface device and a PHY connected to a port on the physical network switch using the virtualized network device; and
   modifying a non-VLAN configuration using the virtualized network device, wherein the modifying does not result in a loss of operation of the first VLAN.

16. The method of claim 15, wherein communication using the virtualized network device passes through the physical network switch.

17. The method of claim 15, wherein the connection of the IHS MAC Ethernet interface device and the physical network switch MAC Ethernet interface device is an eth2 Ethernet interface and modifications to the non-VLAN configuration using the virtualized network device are performed over an eth0 Ethernet interface.

18. The method of claim 15, wherein the modifying the non-VLAN configuration using the virtualized network device includes an ifconfig operation.

19. The method of claim 15, wherein the first VLAN is logically added to a Ethernet driver for the connection of the IHS MAC Ethernet interface device and the physical network switch MAC Ethernet interface device.

20. The method of claim 19, wherein the a non-VLAN device operates in parallel with the first VLAN.

* * * * *